US012646885B2

(12) United States Patent
Huang et al.

(10) Patent No.: US 12,646,885 B2
(45) Date of Patent: Jun. 2, 2026

(54) COAXIAL CONNECTOR ASSEMBLY WITH AN IMPROVED SHELL

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Teng Huang, Shenzhen (CN); Shih-Wei Hsiao, New Taipei (TW); Yu-San Hsiao, New Taipei (TW); De-Jin Chen, Shenzhen (CN); He Chen, Zhengzhou (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 342 days.

(21) Appl. No.: 18/406,549

(22) Filed: Jan. 8, 2024

(65) Prior Publication Data

US 2024/0235096 A1 Jul. 11, 2024

(30) Foreign Application Priority Data

Jan. 9, 2023 (CN) ......................... 202320044286.8

(51) Int. Cl.
*H01R 13/50* (2006.01)
*H01R 13/627* (2006.01)
(Continued)

(52) U.S. Cl.
CPC ......... *H01R 13/50* (2013.01); *H01R 13/6272* (2013.01); *H01R 24/50* (2013.01); *H01R 2103/00* (2013.01); *H01R 2201/26* (2013.01)

(58) Field of Classification Search
CPC .... H01R 13/50; H01R 13/6272; H01R 24/50; H01R 24/38; H01R 2103/00; H01R 2201/26
(Continued)

(56) References Cited

U.S. PATENT DOCUMENTS 6,358,062 B1 * 3/2002 Feldman ................ H01R 24/50 439/63
9,905,968 B2 2/2018 Yanase et al.
(Continued)

FOREIGN PATENT DOCUMENTS

| | | |
|---|---|---|
| CN | 214409303 U | 10/2021 |
| CN | 111276854 B | 11/2021 |
| CN | 218005381 U | 12/2022 |

*Primary Examiner* — Gary F Paumen
(74) *Attorney, Agent, or Firm* — Ming Chieh Chang

(57) ABSTRACT

A coaxial connector includes: a shell integrally formed as a unitary piece; and an insulator and a conductive contact retained to the insulator, the contact having an upper contacting portion and a lower contacting portion extending out of the insulator, wherein the shell includes a first mating tube opening upwards, a second mating tube opening upward and disposed in the first mating tube, a receiving cavity opening downward, and a third mating tube disposed in the receiving space, the insulator is assembled and fixed in the shell, and the upper contacting portion is exposed to the second mating tube and the lower contacting portion is exposed to the third mating tube.

16 Claims, 7 Drawing Sheets

(51) Int. Cl.
*H01R 24/50* (2011.01)
*H01R 103/00* (2006.01)

(58) Field of Classification Search
USPC .......................................... 439/63, 578, 675
See application file for complete search history.

(56) References Cited

U.S. PATENT DOCUMENTS

| | | | | |
|---|---|---|---|---|
| 11,569,611 | B2 | 1/2023 | Inoue et al. | |
| 12,347,963 | B2 * | 7/2025 | Chen .................. | H01R 13/5202 |
| 2005/0221631 | A1 * | 10/2005 | Yamaguchi ............ | H01R 24/50<br>439/63 |
| 2023/0223723 | A1 | 7/2023 | Chen | |
| 2023/0238732 | A1 | 7/2023 | Chen | |

* cited by examiner

COAXIAL CONNECTOR ASSEMBLY WITH AN IMPROVED SHELL

BACKGROUND OF THE INVENTION

Field of the Invention

The present invention relates to a coaxial connector assembly for connecting signals of a car camera.

Description of Related Arts

China Patent No. 218005381 discloses a coaxial connector for connecting signal from a car camera, which includes an outer housing, a hollow conductive barrel, and a contact fixed in the barrel. The barrel is fixed in the outer housing by sealant, which not only makes the assembling of the coaxial connector difficult, but also has a risk of loosening as a car is in a relatively high vibration state.

Therefore, it is desired to provide a coaxial connector assembly with an improved shell.

SUMMARY OF THE INVENTION

An object of the present invention is to provide a coaxial connector and coaxial connector assembly with an improved shell. To achieve the above object, a coaxial connector comprises: a shell integrally formed as a unitary piece; and an insulator and a conductive contact retained to the insulator, the contact comprising an upper contacting portion and a lower contacting portion extending out of the insulator, wherein the shell comprises a first mating tube opening upwards, a second mating tube opening upward and disposed in the first mating tube, a receiving cavity opening downward, and a third mating tube disposed in the receiving space, the insulator is assembled and fixed in the shell, and the upper contacting portion is exposed to the second mating tube and the lower contacting portion is exposed to the third mating tube.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
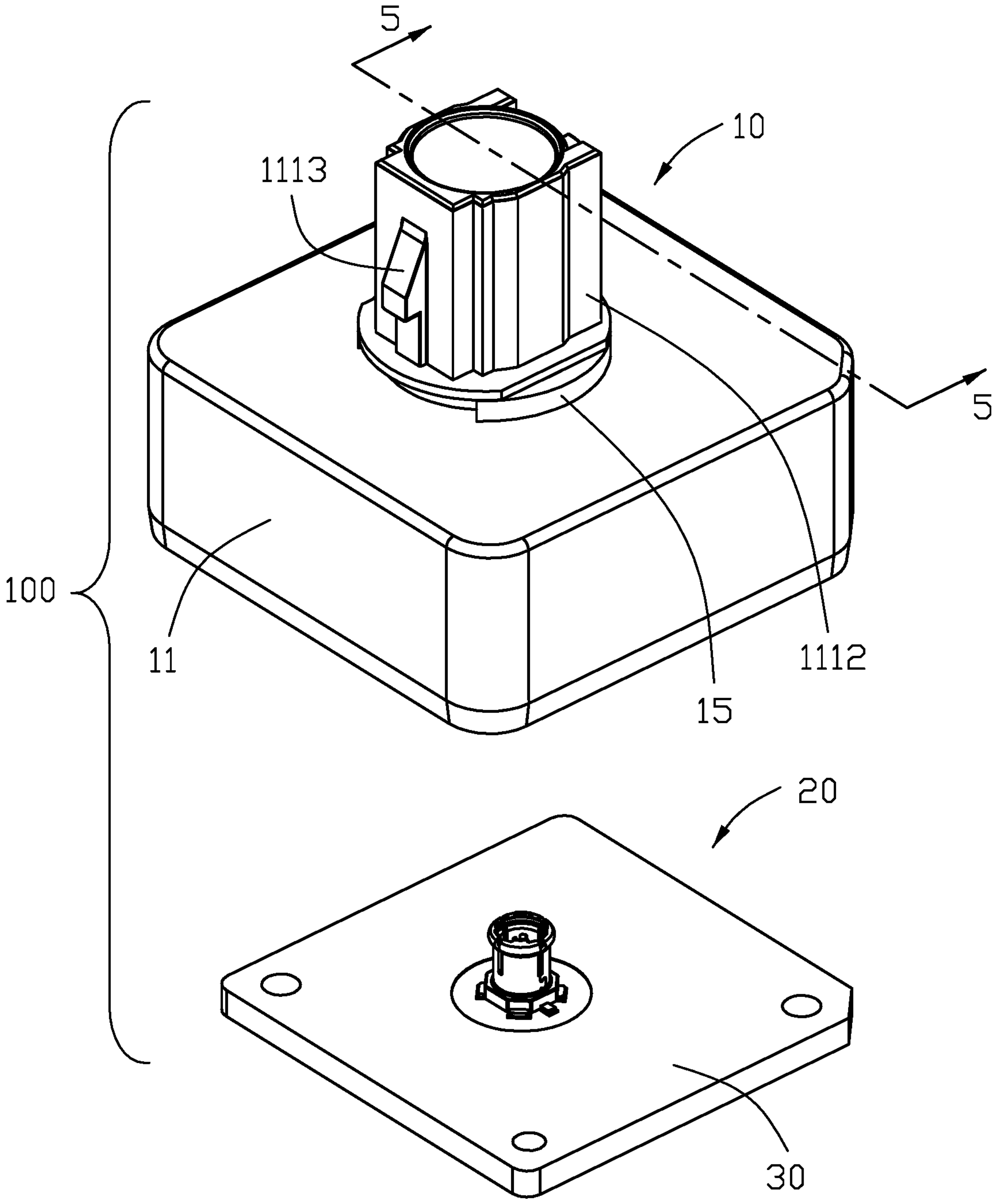
FIG. 1 is a perspective view of a coaxial connector assembly when a coaxial connector and a board connector are separated from each other.
Figure 2:
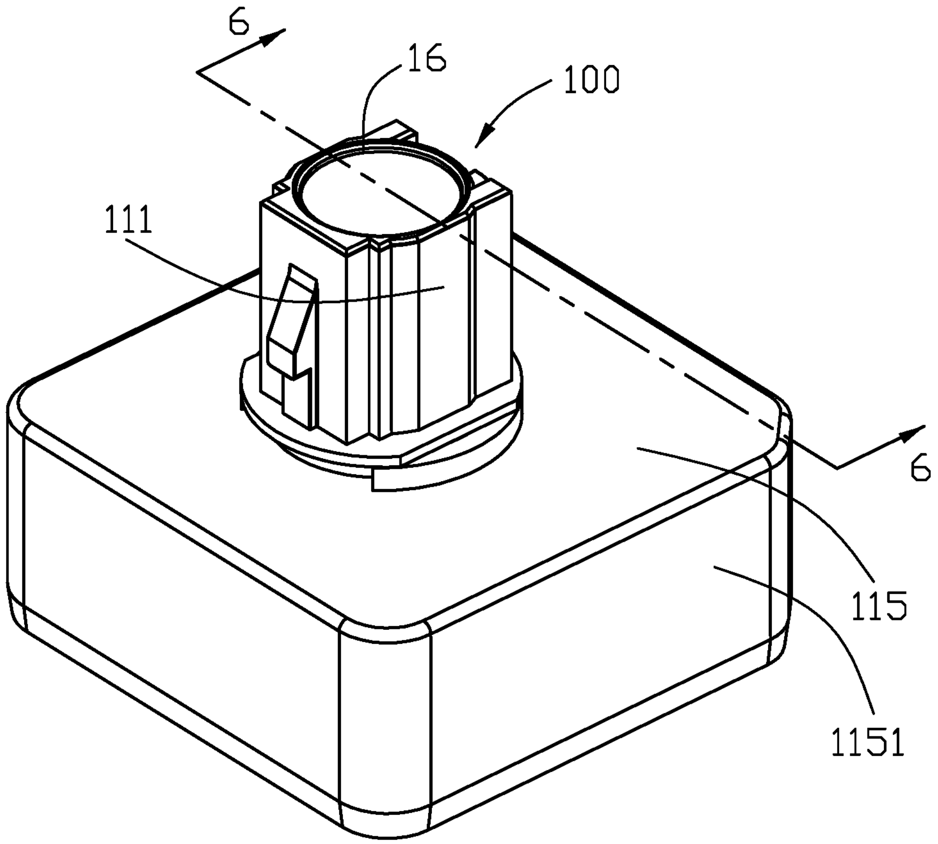
FIG. 2 is a perspective view of the mated coaxial connector assembly in FIG. 1.

Reference will now be made in detail to the preferred embodiments of the present invention.

Referring to FIGS. 1-4 showing a coaxial connector assembly 100, the coaxial connector assembly 100 includes a coaxial connector 10 and a board connector 20 which is adapted for mounting on a circuit board 30. The coaxial connector 10 includes a shell 11 which is integrally formed of metal like zinc alloy or aluminum alloy, an insulator 12 received and retained in the shell 11 and a conductive contact 13 retained in the insulator 12. Combining with FIG. 5, the shell 11 includes a flat portion 115, a first mating tube 111 and a second mating tube 112 which both extending upwardly from the flat portion 115 and opening upward. The first mating tube 111 surrounds the second mating tube 112 and spaces from the second mating tube 112 radially. The shell 11 further includes four side walls 1151 and an island portion 1152 extending downwards from the flat portion 115. The island portion 1152 has a third mating tube 113.

Figure 3:
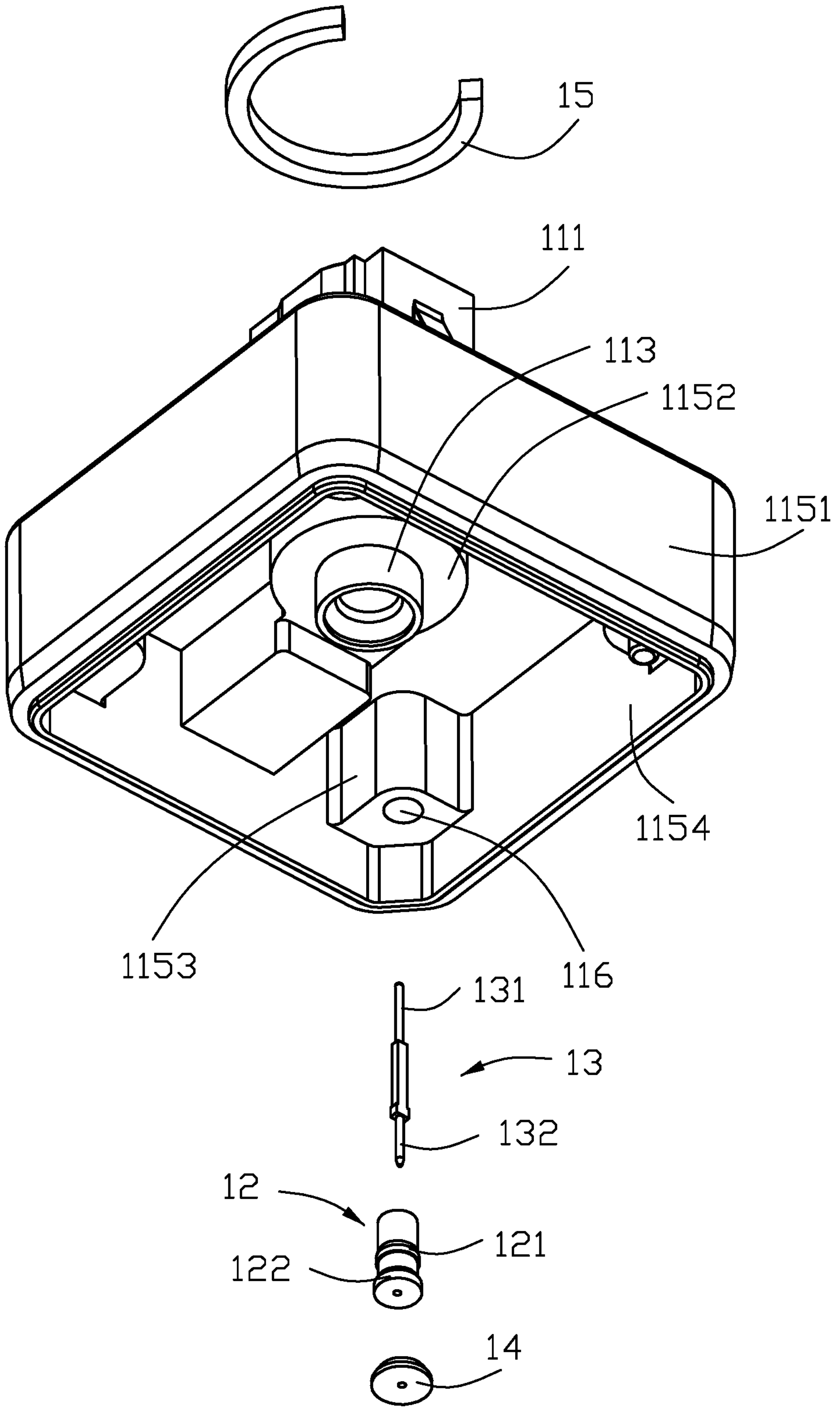
FIG. 3 is an exploded perspective view of the coaxial connector in FIG. 1.
Figure 5:
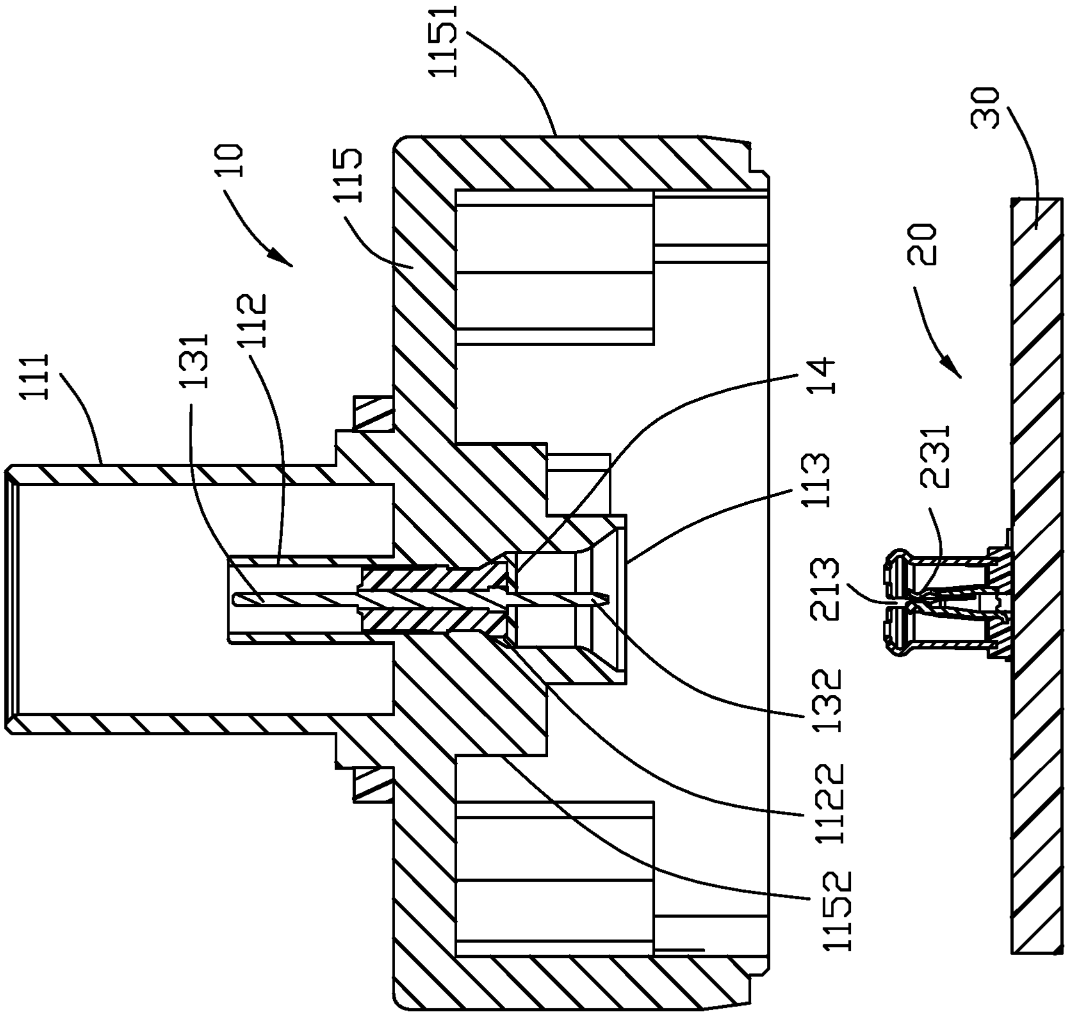
FIG. 5 is a cross-sectional view of the coaxial connector assembly taken along line 5-5 of FIG. 1.

Referring to FIGS. 1, 3, and 5, the flat portion 115 and the four side walls 1151 commonly define a receiving cavity 1154 in which the third mating tube 113 is located. The second mating tube 112 and the third connecting tube 113 are hollow with a channel 114, the channel 114 goes through from the second mating tube 112 to the third mating tube 113. The insulator 12 is cylindrical and fixed in the channel 114. The contact 13 is retained in the insulator 12 and has a first contacting portion 131 and a second contacting portion 132 extending out of the insulator 12. The first contacting portion 131 is exposed in the second connecting tube 112 and second contacting portion 131 is exposed in the third connecting tube 113. Preferably, in order to make a better sealing of the coaxial connector 10, the contact 13 of a needle-shape is injection molded with the insulator 12 and a sealing ring 16 is installed near an upper end of the second connecting tube 112. The shell 11 further includes a plurality of fixing columns 1153 extending downwardly from the flat portion 115 at four corners of the receiving cavity 1154 for fixing the circuit board 30 in the receiving cavity 1154 to the coaxial connector 10.

Figure 6:
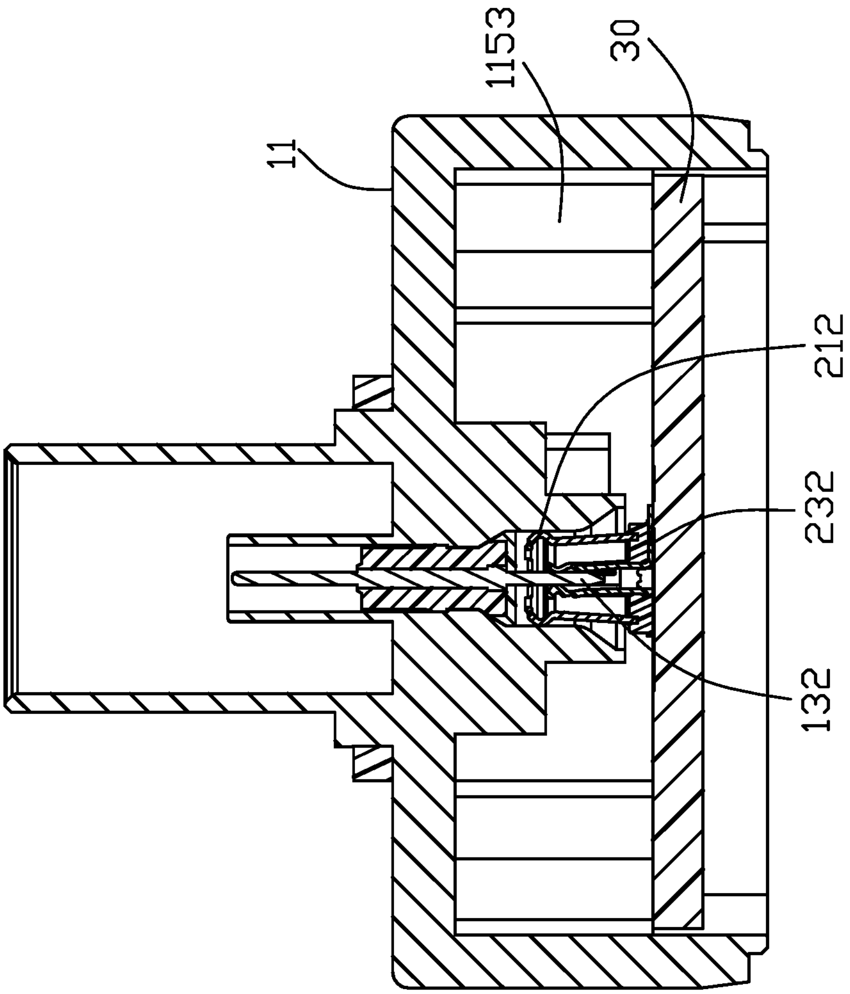
FIG. 6 is a cross-sectional view of coaxial connector assembly taken along line 6-6 of FIG. 2.
Figure 7:
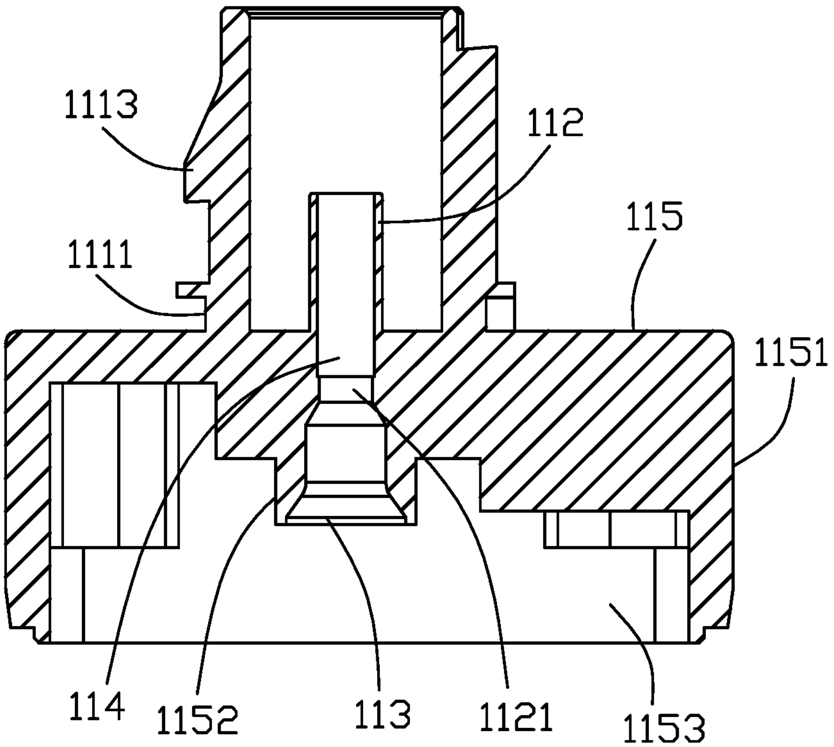
FIG. 7 is a cross-sectional view of the shell.

Referring to FIGS. 5-7, the channel 114 has a latching groove 1121, and the insulator has a ring rib 121 protruding in the radial direction. The ring rib 121 is located in the latching groove 1121 for fixing the insulator 12 into the channel 114, that is the ring rib 121 is interference fit with an inside of the channel 114. Alternative, the latching groove 1121 can be disposed in the insulator 12. The channel 114 of the third mating tube 113 is of a trumpet shape and a diameter near a lower end thereof is larger, and a receiving groove 1122 is formed at the lower end thereof. The insulator 12 has a limiting portion 122 with a larger diameter located in the receiving groove 1122. Firstly, the contact 13 and the insulator 12 are injection molded. Secondly, the insulator 12 with the contact 13 is inserted into the channel 114 of the shell 11 upwardly from the lower end of the channel 114 until the ring rib 121 snaps into the latching groove 1121 and the limiting portion 122 is received in the receiving groove 1122. Thirdly, a seal 14 is installed into the third mating tube 113 under the limiting portion 122. The second contacting portion 132 goes through the seal 14. A height of the second mating tube 112 is substantially a half height of the first mating tube 111.

Figure 4:
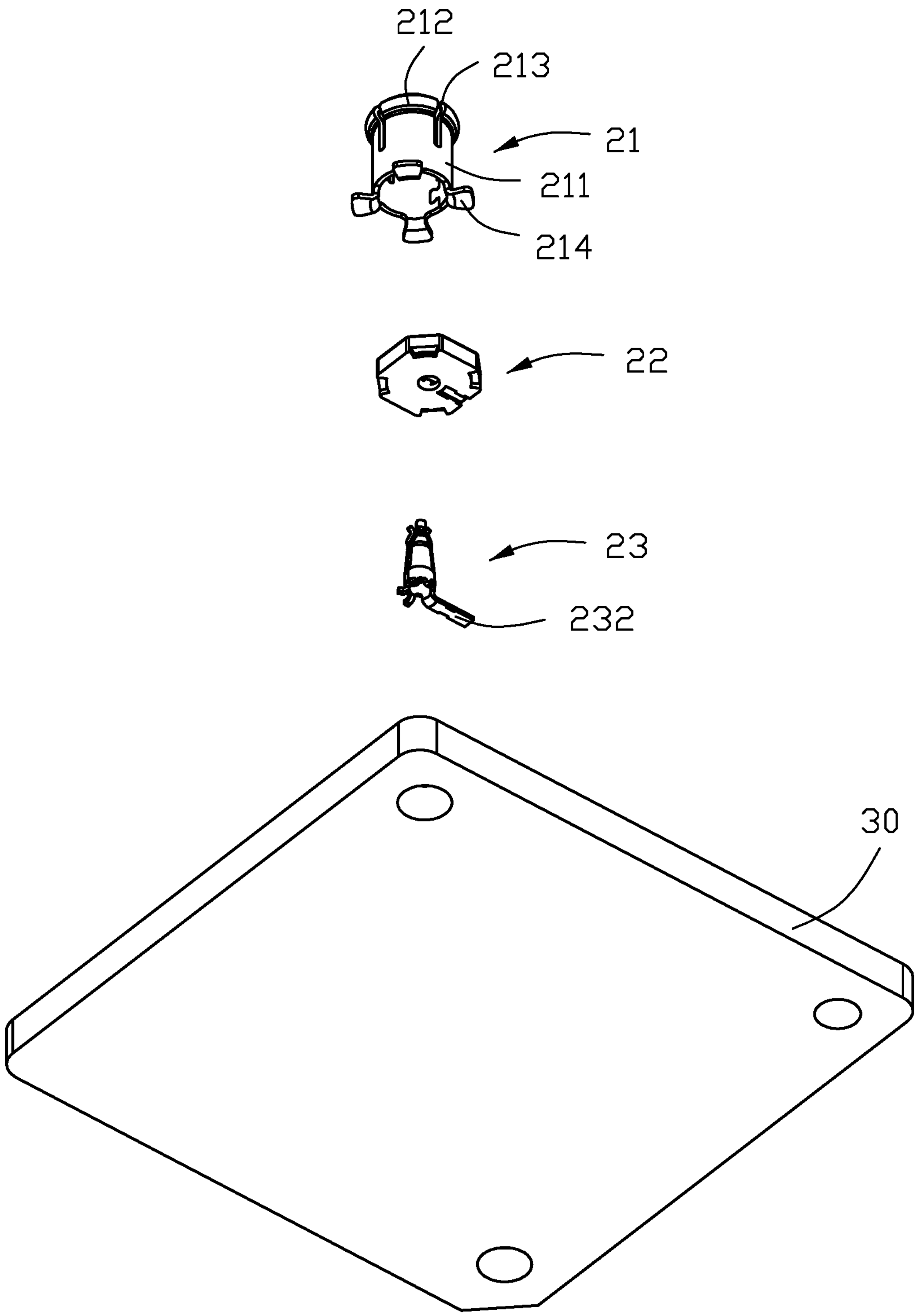
FIG. 4 is an exploded perspective view of the board connector in FIG. 1.

Referring to FIGS. 4-5, the board connector 20 includes an insulator 22, a contact 23 retained in the insulator 22 for connecting with the second contacting portion 132, and a conductive sleeve 21 surrounding the contact 23 and the insulator 22. The conductive sleeve 21 includes a main portion 211, a resisting portion 212 protruding radially outward near an upper end of the main portion 211 and a plurality of slots 213 go through the resisting portion 212 in an upper-lower direction, thereby making the resisting portion 212 more elastic. The contact 23 is of a hollow tube shape that gradually shrinks in a radial direction from the lower end to the upper end thereof, and a neck portion 231 is formed near the top end thereof for clamping and electrically connecting with the second contacting portion 132. The conductive sleeve 21, the contact 23 and the insulator 22 are injection molded with each other. A plurality of tails 214 extend outward from the bottom edge of the conductive sleeve 21 for connecting with the circuit board 30, the contact 23 has one tail 232 extending horizontally.

Referring to FIGS. 5-6, after the board connector 20 is mounted on the circuit board 30, the board connector 20 is inserted into the third mating tube 113 until the resisting portion 212 elastically resists against the inner wall of the third mating tube 113 and the neck portion 231 electrically clamps the second contacting portion 132. The lower end of the fixing column 1153 abuts with an upper face of the circuit board 30, and bolts pass through the circuit board 30 and a fixing hole of the fixing column 1153 to make the coaxial connector 10 and the board connector 20 fixed firmly.

Referring to FIGS. 1 and 7, an outer wall of the first mating tube 111 has a latch 1113 for locking with a mating connector, a plurality of guiding ribs 1112 and a clapping groove 1111 near the flat portion 115. A colored ring 15 is clapped in the clapping groove 1111. The mating connector has a labeled color which is the same with the color of the colored ring for conveniently finding the correct mating connector. Other colored ring 15 can be replaced in the clapping groove 1111 when the coaxial connector is used to mating with other mating connector.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. A coaxial connector comprising:

a shell integrally formed as a unitary piece; and an insulator and a conductive contact retained to the insulator, the contact comprising an upper contacting portion and a lower contacting portion extending out of the insulator;

wherein the shell comprises a first mating tube opening upwards, a second mating tube opening upward and disposed in the first mating tube, a receiving cavity opening downward, and a third mating tube disposed in the receiving space, the insulator is assembled and fixed in the shell, and the upper contacting portion is exposed to the second mating tube and the lower contacting portion is exposed to the third mating tube.

2. The coaxial connector as claimed in claim 1, wherein the shell is made from zinc alloy or aluminum alloy.

3. The coaxial connector as claimed in claim 1, wherein each of the upper contacting portion and the lower contacting portion is of a needle-shape.

4. The coaxial connector as claimed in claim 1, wherein the shell comprises a flat portion, an island portion, and side walls extending downward from the flat portion, the receiving space is defined among the flat portion and the side walls, the third mating tube extends downwardly from the island portion, and a channel is disposed running through from the second mating tube to the third mating tube.

5. The coaxial connector as claimed in claim 4, wherein the channel in the third mating tube is of a trumpet shape with a larger diameter at a lower end thereof, and the insulator is assembled into the channel from the lower end of the third mating tube.

6. The coaxial connector as claimed in claim 5, wherein the insulator has a limiting portion with a larger diameter at the lower end thereof, a seal is installed into the third mating tube and is attached under the limiting portion, and the second contacting portion goes through the seal.

7. The coaxial connector as claimed in claim 4, wherein the insulator is cylindrical and has a ring rib around an outside thereof, and the ring rib is interference fit with an inside of the channel.

8. The coaxial connector as claimed in claim 1, wherein the first mating tube has a locking latch and plural guiding ribs extending in an upper and lower direction at an outside thereof.

9. The coaxial connector as claimed in claim 8, wherein a colored ring is set around the outside of the first mating tube below the locking latch.

10. A coaxial connector assembly comprising:

a coaxial connector comprising:

a first insulator and a first contact retained to the insulator, the first contact comprising an upper contacting portion and a lower contacting portion; and a shell integrally formed as a unitary piece and having a first mating tube, a second mating tube located in the first mating tube, a receiving space, and a third mating tube located in the receiving cavity, wherein the insulator is assembled in the shell and the upper contacting portion extends into the second mating tube and the lower contacting portion extends into the third mating tube;

a circuit board received in the receiving cavity; and a board connector mounted on the circuit board and comprising:

a second insulator;

a second contact retained in the second insulator; and a conductive sleeve received in the third mating tube and elastically contacts an inside of the third mating tube.

11. The coaxial connector assembly as claimed in claim 10, wherein the shell comprises a flat portion, four side walls extending downward from the flat portion, and the flat portion and the four side walls commonly form the receiving space.

12. The coaxial connector assembly as claimed in claim 10, wherein the shell has several fixing columns at corners of the receiving space, and the fixing columns are fixed on the circuit board by bolts.

13. The coaxial connector assembly as claimed in claim 10, wherein the conductive sleeve defines a resisting portion protruding radially outward near an upper end thereof and a plurality of slots through the resisting portion, and the resisting portion elastically resists on the inside of the third mating tube.

14. The coaxial connector assembly as claimed in claim 10, wherein the lower contacting portion is of a needle shape, the second contact is of a tube, and the lower contacting portion is inserted into the second contact.

15. The coaxial connector assembly as claimed in claim 10, wherein a height of the second mating tube is substantially a half height of the first mating tube.

16. The coaxial connector assembly as claimed in claim 10, wherein the second contact and the conductive sleeve have a plurality of tails electrically connected to the circuit board.

* * * * *